US012578979B2

(12) United States Patent　　(10) Patent No.: US 12,578,979 B2
Dhatchina Moorthy et al.　　(45) Date of Patent: Mar. 17, 2026

(54) VISUALIZATION OF APPLICATION CAPABILITIES

(71) Applicant: Microsoft Technology Licensing, LLC, Redmond, WA (US)

(72) Inventors: Madhan Kumar Dhatchina Moorthy, Redmond, WA (US); Christopher Bradley Spaidal, North Vancouver (CA); Dmitry Lesnoy, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 18/076,240

(22) Filed: Dec. 6, 2022

(65) Prior Publication Data

US 2024/0126577 A1　　Apr. 18, 2024

Related U.S. Application Data

(60) Provisional application No. 63/416,150, filed on Oct. 14, 2022.

(51) Int. Cl.
　　*G06F 9/451*　　　(2018.01)
　　*G06F 8/61*　　　(2018.01)

(52) U.S. Cl.
　　CPC ............... *G06F 9/453* (2018.02); *G06F 8/61* (2013.01)

(58) Field of Classification Search
　　CPC .................................. G06F 8/61; G06F 9/453
　　See application file for complete search history.

(56) References Cited

U.S. PATENT DOCUMENTS

| | | | | |
|---|---|---|---|---|
| 2010/0175044 A1* | 7/2010 | Doddavula | ............... | G06F 8/36 |
| | | | | 717/104 |
| 2016/0019557 A1* | 1/2016 | Batra | .................... | G06F 3/0484 |
| | | | | 705/7.29 |
| 2016/0042426 A1* | 2/2016 | Mowatt | .................. | G06Q 10/00 |
| | | | | 705/26.5 |
| 2016/0292135 A1* | 10/2016 | Mowatt | ............... | G06F 9/44526 |

(Continued)

FOREIGN PATENT DOCUMENTS

| | | | | |
|---|---|---|---|---|
| WO | WO-0237311 A2 * | 5/2002 | ............. | G06Q 10/10 |

OTHER PUBLICATIONS

Mendix Marketplace, "Reusable Components", published Aug. 7, 2018 to https://www.mendix.com/evaluation-guide/app-lifecycle/develop/app-store, retrieved Feb. 11, 2025. (Year: 2018).*

(Continued)

*Primary Examiner* — Shourjo Dasgupta

(74) *Attorney, Agent, or Firm* — Workman Nydegger

(57) ABSTRACT

A systematic mechanism for visualizing functions or capabilities that an application has. One or more user experience objects are generated corresponding to an application. An application definition is obtained for that application, and then multiple user experience templates are identified based on that application definition. Information from the application definition is then used to populate at least one of the user experience templates to generate at least one object experience object. The user may then review visualizations of the user experience objects to determine the general capabilities of the application, and thereby determine whether to install or open the application, and how best to use the application.

20 Claims, 8 Drawing Sheets

(56)                  References Cited

U.S. PATENT DOCUMENTS

| | | | |
|---|---|---|---|
| 2016/0321064 A1* | 11/2016 | Sankaranarasimhan | ..................... |
| | | | H04L 67/34 |
| 2020/0371757 A1* | 11/2020 | Shukla | .................. G06F 16/907 |
| 2021/0042796 A1* | 2/2021 | Khoury | .............. G06Q 30/0272 |
| 2022/0383396 A1* | 12/2022 | Haapoja | ............. G06Q 30/0639 |

OTHER PUBLICATIONS

Modern Web, "How to make an e-commerce website with HTML, CSS, and JS-01", published on Jan. 8, 2022 to https:/dev.to/themodernweb/how-to-make-an-e-commerce-website-with-html-css-and-js-3aon, retrieved Feb. 11, 2025. (Year: 2022).*

Donny Wals, "Breaking an app up into modules", published on Dec. 15, 2019 to https://www.donnywals.com/breaking-an-app-up-into-modules, retrieved Feb. 11, 2025. (Year: 2019).*

Arya Surya, "Getting Started with iOS App Modularization—An Introduction", published on Sep. 16, 2022 to https://medium.com/tokopedia-engineering/getting-started-with-ios-app-modularization-an-introduction-e1ee1b3ead6a, retrieved Feb. 11, 2025. (Year: 2022).*

Jonathan Saring, "Sharing UI Components to Build Consistent UIs Faster", published on Nov. 26, 2019 to https://javascript.plainenglish.io/sharing-ui-components-to-build-consistent-uis-faster-5e60141ca855, retrieved Feb. 11, 2025. (Year: 2019).*

Larry Wei, etc., "Building the New Uber Freight App as Lists of Modular, Reusable Components", published on Aug. 22, 2019 to https://www.uber.com/blog/uber-freight-app-architecture-design, retrieved Feb. 11, 2025. (Year: 2019).*

Toni Gemayel, "How to wireframe", published on Aug. 12, 2019 to https://www.figma.com/blog/how-to-wireframe, retrieved Nov. 12, 2025. (Year: 2019).*

Microsoft Support, "Use Wireframe Templates to design websites and mobile apps", published on Sep. 4, 2017 to https:// support.microsoft.com/en-us/office/use-wireframe-templates-to-design-websites-and-mobile-apps-2d54dc55-f5c4-49a2-85da-d649eb7fc281, retrieved Nov. 12, 2025. (Year: 2017).*

Miroverse, "Wireframe Templates", published on Oct. 28, 2020 to https://miro.com/templates/wireframe, retrieved Nov. 12, 2025. (Year: 2020).*

International Preliminary Report on Patentability received for PCT Application No. PCT/US2023/031784, Apr. 24, 2025, 10 pages.

International Search Report and Written Opinion received for PCT Application No. PCT/US2023/031784, Dec. 15, 2023, 15 pages.

* cited by examiner

600

Computing System
700

Network
710

Communication
Channels
708

UI 712

Output
712A

Input
712B

Processor(s)
702

Memory
704

706

Volatile

Non-Volatile

VISUALIZATION OF APPLICATION CAPABILITIES

CROSS-REFERENCE TO RELATED APPLICATIONS

This application claims the benefit of U.S. Provisional Application No. 63/416,150, filed Oct. 14, 2022.

BACKGROUND

A variety of platforms exist that allow a user to install and/or open applications. As an example, the platform could be an operating system as multiple applications may run using the operating system as a platform. As another example, various applications may be installed and/or opened to supplement the capabilities of a service, such as a service that enables collaboration between users. As yet another example, an app store may be used to acquire and/or open applications suitable to a particular operating environment. However, when installing or opening an application, there are cases when a user may not be fully aware of what the capabilities of the application are.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein provide for a systematic mechanism for visualizing functions or capabilities of applications. The end-user may then have transparency about application functionalities/capabilities. This better informs an end-user's decisions about whether to acquire an application. Furthermore, for those applications already acquired, the end-user may explore the capabilities of the application post-installation as they are made aware of how to use the applications soon after installation in the early stage of the user's experience with the application. Thus, embodiments described herein allow a user to better use the capabilities of computing systems that offer platforms in which applications can be installed and/or run.

In accordance with embodiments described herein, one or more user experience objects are generated corresponding to an application. An application definition is obtained for that application, and then multiple user experience templates are identified based on that application definition. Information from the application definition is then used to populate at least one of the user experience templates to generate at least one object experience object. The user may then review visualizations of the user experience objects to determine the general capabilities of the application, and thereby determine whether to install or open the application, and how best to use the application.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Embodiments described herein provide for a systematic mechanism for visualizing functions or capabilities of applications. The end-user may then have transparency about application functionalities/capabilities. This better informs an end-user's decisions about whether to acquire an application. Furthermore, for those applications already acquired, the end-user may explore the capabilities of the application post-installation as they are made aware of how to use the applications soon after installation in the early stage of the user's experience with the application. Thus, embodiments described herein allow a user to better use the capabilities of computing systems that offer platforms in which applications can be installed and/or run.

In accordance with embodiments described herein, one or more user experience objects are generated corresponding to an application. An application definition is obtained for that application, and then multiple user experience templates are identified based on that application definition. Information from the application definition is then used to populate at least one of the user experience templates to generate at least one object experience object. The user may then review visualizations of the user experience objects to determine the general capabilities of the application, and thereby determine whether to install or open the application, and how best to use the application.

As an example, such a platform may be a library of applications (such as an "app store"). Alternatively, or in addition, the platform may be a platform (such as an operating system, or another application) in which other applications may be run. Thus, a user may be more informed about what applications to install from or within a given platform, or what post-installed applications to run within the given platform.

In some embodiments, the systematic mechanism for visualizing functions that an application has is defined by an application definition (such as an application manifest). As an example, that application definition may either be within an executable file of the application being described, or else may be in a separate file that accompanies or is otherwise associated with the application. In some embodiments, the application definitions for the applications within the platform follow a particular schema. Alternatively, they may follow one of multiple schemas so long as the schemas are identifiable, and interpretable. The application definition may be validated by the platform or the platform provider to ensure that the application definition follows the appropriate schema.

Figure 1:
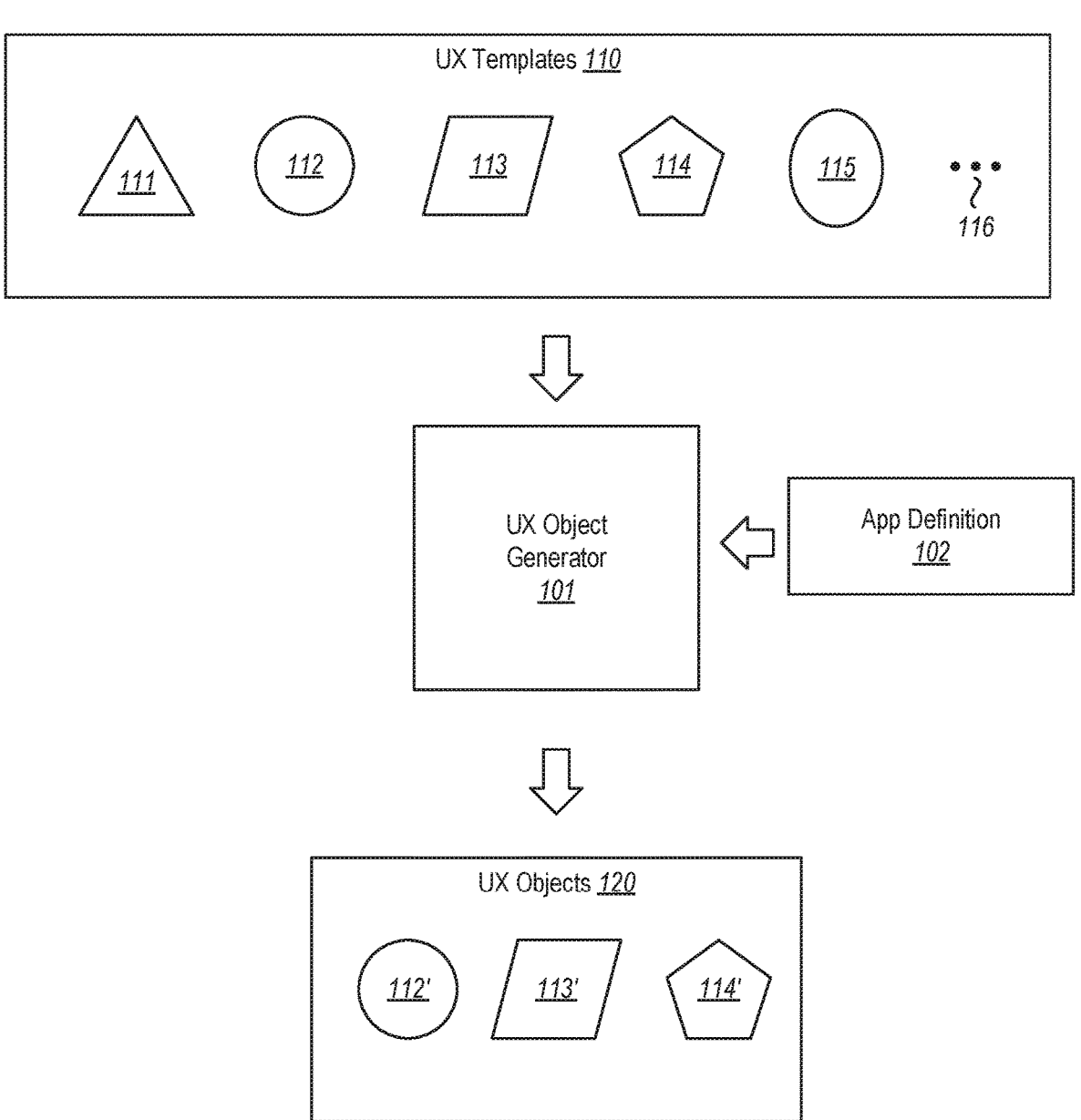
FIG. 1 illustrates an example environment in which the principles described herein may operate, which environment includes a user experience object generator that selects and populates user experience templates depending on an application definition to thereby generate a user experience object set.

FIG. 1 illustrates an example environment 100 in which the principles describe herein may operate. The environment 100 includes a user experience object generator 101 that selects and populates user experience templates 110 depending on an application definition 102 to thereby generate user experience object set 120. Thus, different application definitions may result in different user experience templates being selected and/or affect how the respective templates are populated to generate the respective user experience object. In one embodiment, the user experience object generator 101 may be structure and/or function as described below for the executable component 706 of FIG. 7. In that case, the user experience object generator 101 may be executed by a computing system, such as the computing system 700 of FIG. 7. The computing system may cause the populated user experience object to be visualized, and perhaps even allow the user to open and/or install the corresponding application.

For example, in FIG. 1, depending on the application definition 102, the user experience object generator 101 selects one, some or all of the user experience templates 110. For instance, each of the user experience templates may be associated with a corresponding application capability. If the application definition defines that the application has the respective capability, the user experience object generator 101 selects the responsive user experience template.

Here, the user experience templates 110 are shown as including five possible user experience templates 111 through 115. However, the ellipsis 116 represents that there may potentially be many other numbers of user experience templates available for the user experience object generator 101 to select from. Each user experience template 111 through 115 is illustrated as having a different shape, which symbolically represents that a populated user experience object of each user experience template will have a different visualized representation.

In the particular example of FIG. 1, the user experience object generator 101 generated a user experience object 112' which is a populated copy of the user experience template 112, user experience object 113' which is a populated copy of the user experience template 113, and user experience object 114' which is a populated copy of the user experience template 114. In this example, the user experience object generator 101 used the application definition 102 to select the user experience templates 112, 113 and 114, and to populate the selected templates to thereby form the set of user experience objects 112', 113' and 114', that collectively form the user experience object set 120 that may be visualized to the end user. This is because the application definition defined that the application has the capabilities corresponding to each of the user experience templates 112, 113 and 114.

Each user experience template will be associated with a different capability potentially offered by applications within a platform in which multiple applications may be offered and/or run. As an example, suppose that the application platform is a collaborative communication platform, associated functional categories might each have their own user experience template. As an example only, there might be a user experience template for "use a tab at the top center of a chat or channel", "chat with an application to ask questions and find info", "use collaboratively in meetings", "insert content from the app directly into messages", "get notifications from the app in a channel", "keep track of important content and info", and so forth. However, the principles described herein are not limited to the precise categorization of capabilities associated with applications that are available to install from or within a platform.

Figure 2A:
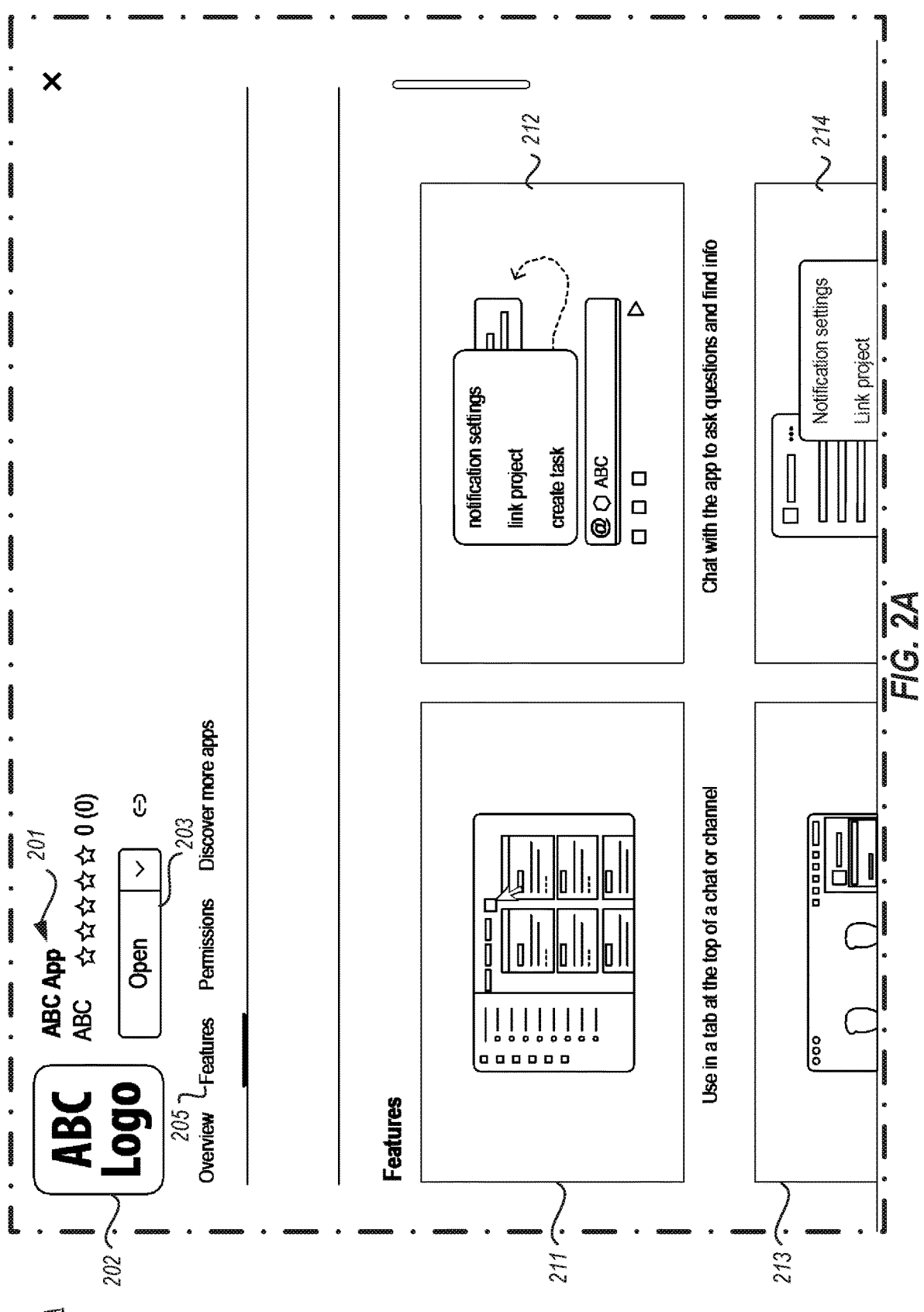
FIG. 2A illustrates a user interface in which various user experience objects associated with an application fictionally called the "ABC App" are visualized along with an open control for opening the ABC App.

FIG. 2A illustrates a user interface 200A in which various user experience objects are provided. At the top of the user interface 200A, the application is identified with an application identifier 201 (here fictionally called "ABC App"). There is also a logo 202 for the application, and a control 203 that is offered to allow the user to open the application if already installed. Alternatively, there may be an install control in the same place as the control 203 that is offered to allow the user to install the application if not already installed. Thus, the user may use the same user interface to determine intuitively what the application is capable of doing, as well as acting on a decision to open or install that application. However, it is not required that the same user interface be used to display the application capabilities as well as have a control for acting on a decision to open or install the application.

Here, by selecting an application, and selecting a "features" tab 205, the user is presented with various user experience objects that are populated.

In particular, there is a user experience object 211 in the upper left that indicates that the application has the capability to use a tab at the top of the chat or channel. That user experience object 211 includes static information in the background that is not specific to an application at all, but visualizes the function of a tab at the top of the chat or channel. Here, "static information" with respect to a user experience object is information that is not specific to an application, but instead is generic to any application that has that function. In addition, there is dynamic information, that is information that is specific to the application and that is populated from data of the application definition. Here, for instance, there is a logo of the application itself within the user experience object 211.

Furthermore, there is a user experience object 212 in the upper right that indicates that the application has the capability to allow the user to chat with the app to ask questions and find information. Again, there is static information in the background that is not specific to the application, but illustrates the ability of a user to chat with the app. However, there is also dynamic information that comes from the application definition. That is the logo of the application is again provided at a predetermined position within the user experience object 212. In addition, here, there are three actions illustrated including "notification settings", "link project", and "create task". These actions come from the application manifest, and thus are also dynamic information that is specific to the application.

Figure 2B:
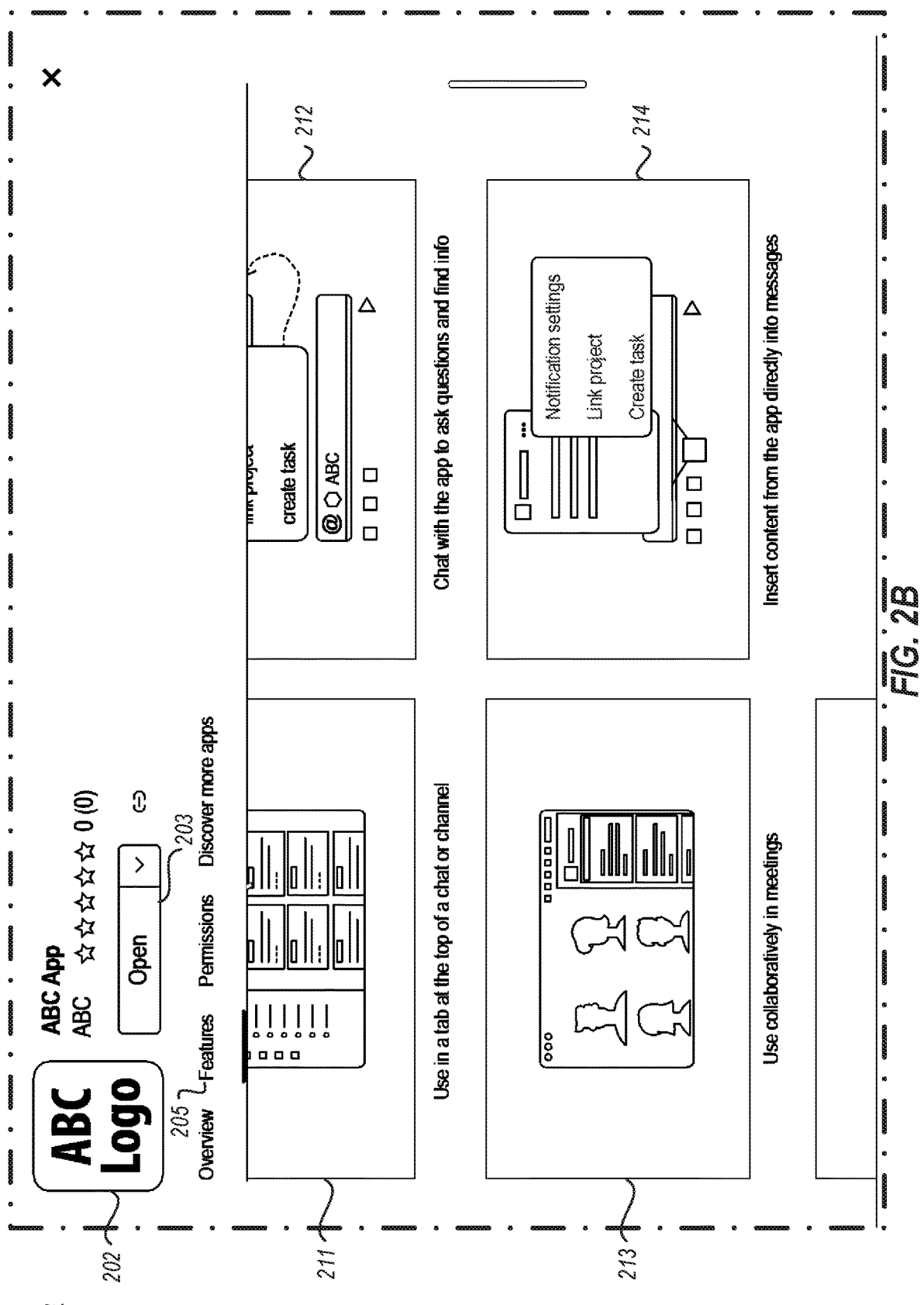
FIG. 2B illustrates a user interface which is the same as that of FIG. 2A, but after having scrolled down to fully show other visualizations of user experience objects of the ABC App application.

By scrolling down, other user experience objects may also be viewed by the user as shown in the user interface 200B of FIG. 2B. Here, the bottom left is a visualization of a user experience object 213 that represents the application's capability to be used collaboratively in meetings. There is again static background static image information that represents such capability generally, as well as dynamic information in the form of the logo at the appropriate position.

The bottom right is a visualization of a user experience object 214 that shows the application's capability to have content inserted from the app directly into messages. Here, there is static information in the background image that shows that capability generally, as well as dynamic information in the form the logo as well as in the form of actions such as "notification settings", "link project", and "create tasks". Such actions are again taken from the application definition. Note that these actions were the same actions as were illustrated in the user experience object in the upper right user experience object 211. This is because these actions are very specific to the application, and have been pulled from the application manifest in order to populate both user experience objects 211 and 214 that list actions.

Figure 3:
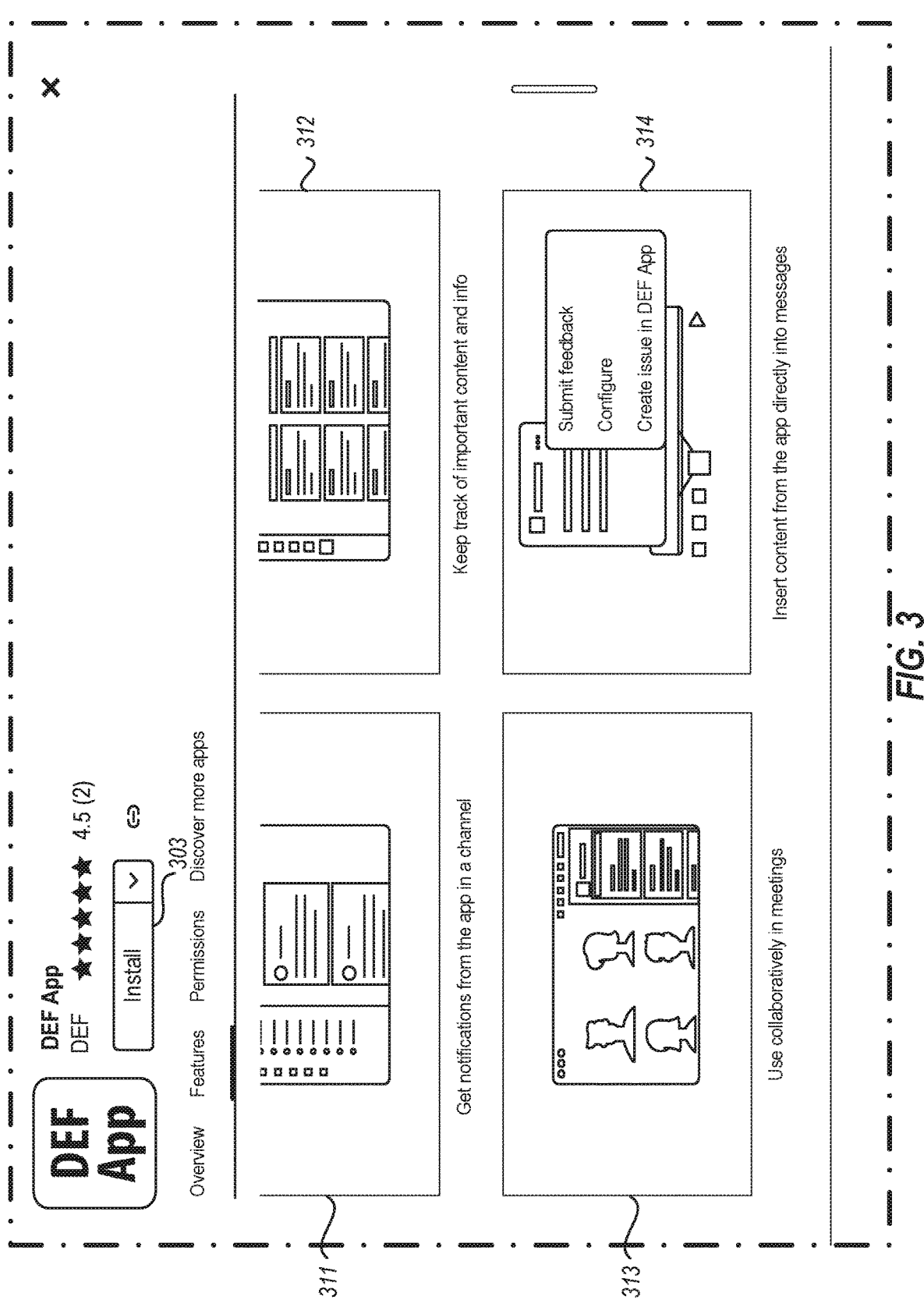
FIG. 3 illustrates a user interface in which various user experience objects associated with an application fictionally called the "DEF App" are visualized along with an install control.

FIG. 3 illustrates a user interface 300 that shows user experience objects for another application called "DEF App". Here, since the application is not yet installed, there is an install control 303 in FIG. 3, instead of the open control as in FIGS. 2A and 2B. In the user interface 300, the bottom right, the user is again presented with a user experience object 314 that represents the capability to insert content from the app directly into messages. Compare this user experience object 314 with the user experience object 214 in the lower right of FIG. 2B. They are both user experience objects that represent the capability to insert content from an app directly into messages, and thus the static background image is the same. However, the dynamic information is different because the application is different. Specifically, the logo is different, and the actions are different. Here, in the user interface object 314 of FIG. 3, the actions are "submit feedback", "configure", and "create issue in DEF App"—actions that are very specific to the application and taken from the application definition.

Note also that while some of the user experience objects between the two applications (one of FIGS. 2A and 2B, and the other of FIG. 3) are the same, some are different. For instance, FIG. 3 illustrates a user experience object 311 in the upper left that shows the capability to "get notifications from an app in a channel", whereas there is no such similar user experience object within the user interfaces of FIGS. 2A and 2B. Furthermore, the user experience object 312 in the upper right of FIG. 3 relates to a capability to keep track of important content and info, whereas FIGS. 2A and 2B do not show a user experience object related to that capability. Thus, each application definition causes the selection of only the appropriate user experience templates that relate to the capability of that application.

Thus, the user can get a visualization of the capabilities of the application through the application-specific selection of the user experience template to populate, as well as the application-specific manner of populating the corresponding selected templates. Again, this can be done prior to installation of the application in the platform, in which case the user experience visualizations give the user an idea of whether to install the application. This can alternatively or in addition be done after installation, which gives the user an idea of what the capabilities of the application are, so that the user can more effectively use the application. Or even perhaps the user may make the decision to delete the application from the platform if the user decides that the user no longer wants any of the capabilities of the application. Therefore, the user is educated about whether to install or delete an application, and whether to open and how to use an installed application. Accordingly, the user may make more effective use of the platform, and the utility of installed applications is increased.

Figure 4:
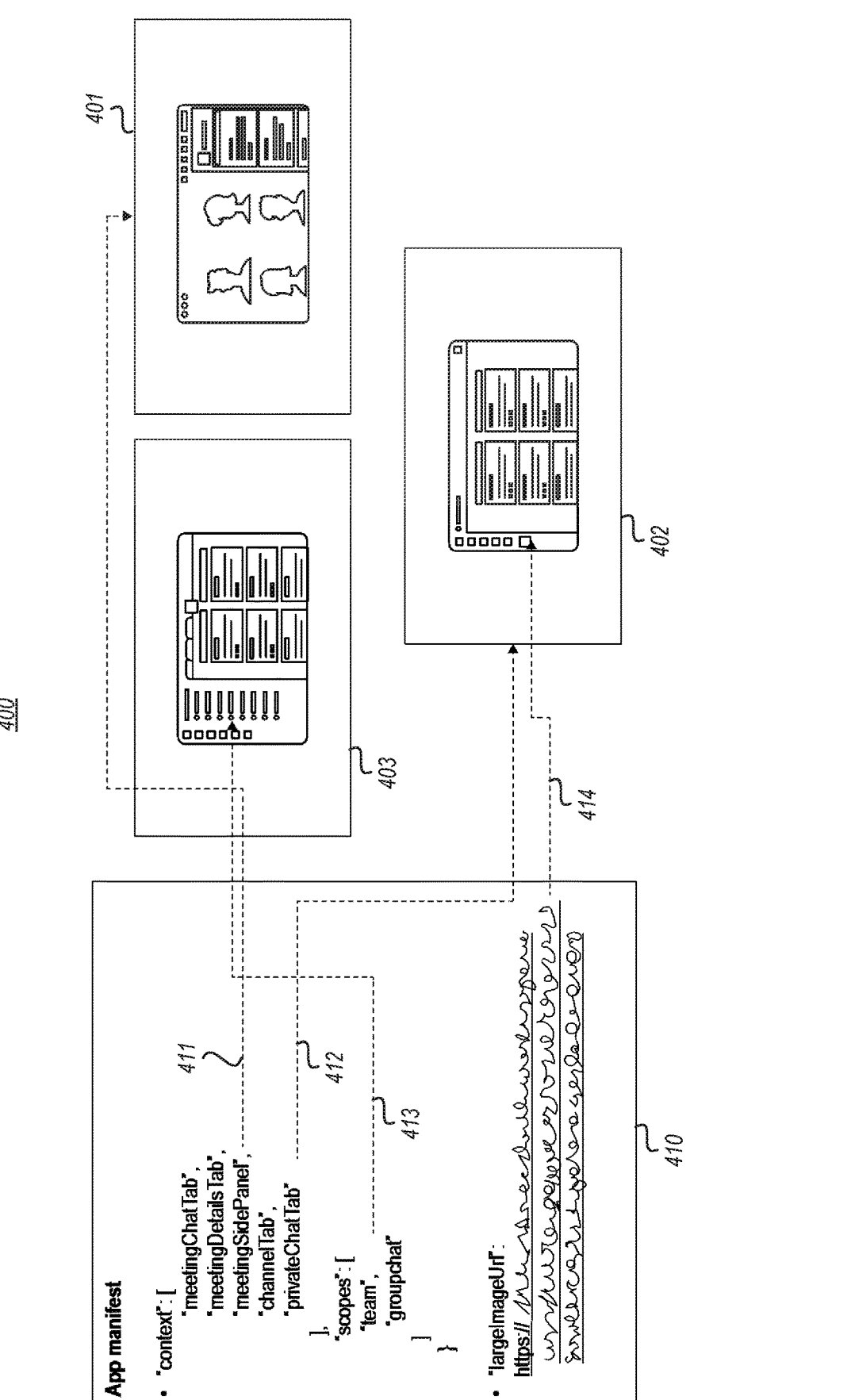
FIG. 4 illustrates some process mappings in which an example application manifest is used to select the user experience templates.

FIG. 4 illustrates some process mappings in which an example application manifest 410 is used to select the user experience templates 401 through 403. The application manifest is an example of the application definition 102 of FIG. 1. In FIG. 4, values in the context element are used to select (as represented by arrows 411, 412 and 413) three respective user experience templates 401, 402 and 403. In addition, a URL value under the largeImageURL element may be used (as represented by arrow 414) to acquire the logo, for insertion into the template-defined portion of the user experience template.

Figure 5:
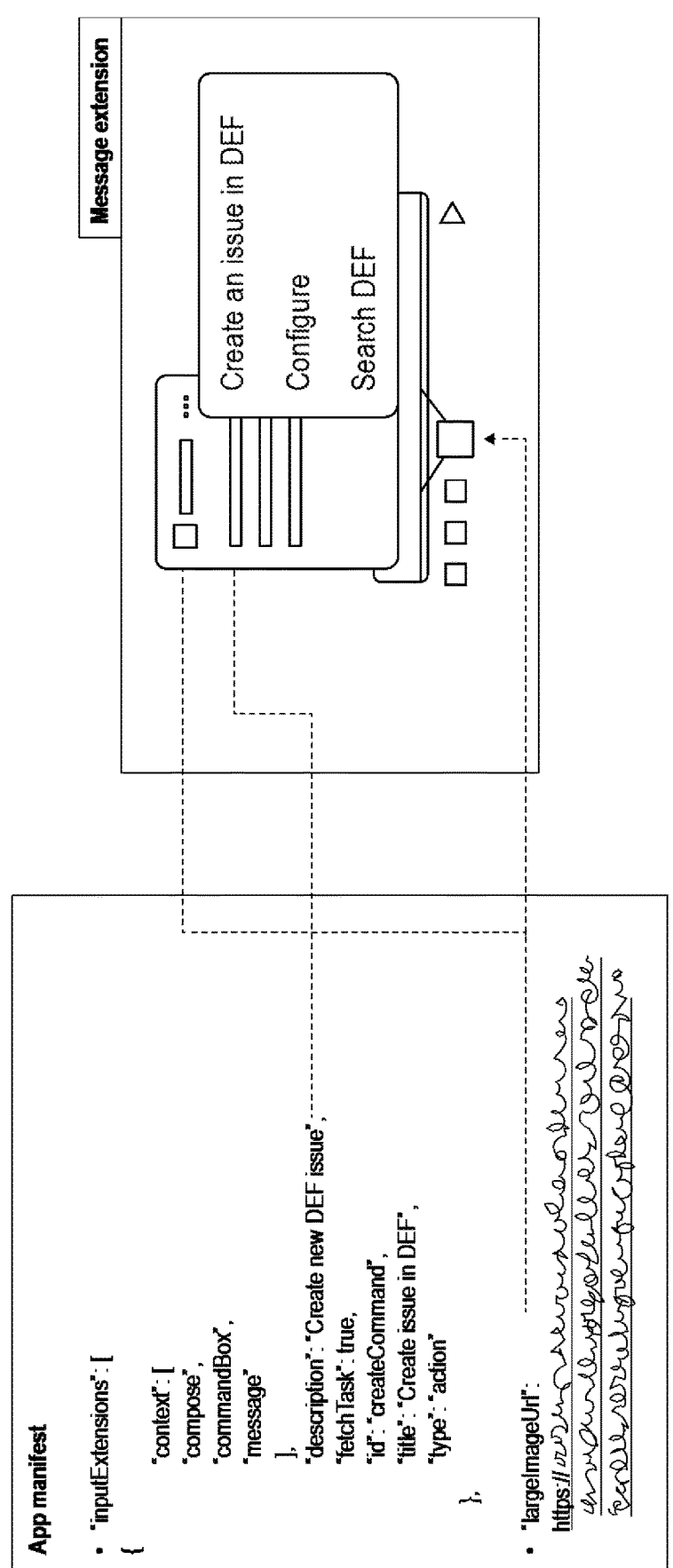
FIG. 5 illustrates a mapping between the application manifest and the selected user experience object that shows an example of how the actions may be populated into the user experience object.

FIG. 5 illustrates a mapping between the application manifest and the selected user experience object that shows an example of how the actions may be populated into the user experience object. Of course, the exact mapping of components of the application manifest into user experience objects will depend on the schema of the application manifest, and the nature of the available user experience templates. Accordingly, the above is a simple example. The broader concept is that an application definition of any sort may be used to select and populate user experience templates to allow a user to be more educated about the pool of available application to install and/or use.

Figure 6:
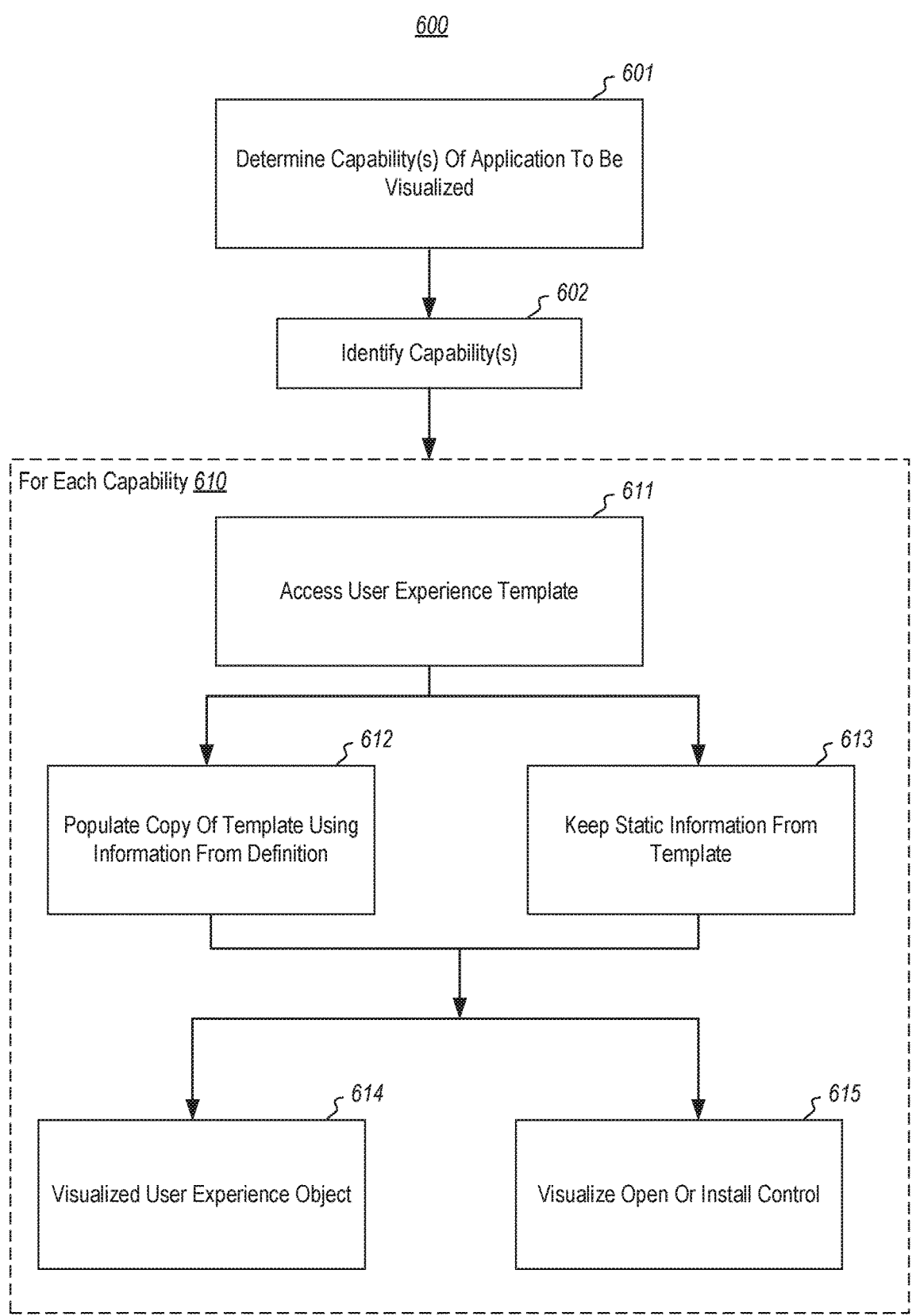
FIG. 6 illustrates a flowchart of a method for generating computer visualizations of one or more capabilities of one or more applications, in accordance with the principles described herein.

FIG. 6 illustrates a flowchart of a method 600 for generating computer visualizations of one or more capabilities of one or more applications, in accordance with the principles described herein. The method 600 is performed in response to determining that one or more capabilities of an application are to be visualized (act 601). As an example, the determination may be made in response to a user navigating to an application identifier. For instance, the user may have navigated in an app store to a particular application.

In response to the determination (act 601), one or more capabilities of the application are identified using the application definition (act 602). Then, for each of the identified capabilities, the context of box 610 is performed to generate a user experience object than when visualized represents the capability. This is done by 1) accessing a user experience template corresponding to the capability from the set of user experience templates (act 611), 2) populating a copy of the user experience template using application-specific information from the application definition (act 612). In addition, the static information from the user experience template is kept in the copy of the user experience template static information from the user experience template (act 613). The copy of the user experience template represents the generated user experience object. An example of this process is illustrated in each of FIGS. 4 and 5.

A visualization of the user experience object is then rendered to the user (act 614). In addition, a control may be also rendered (act 615) (potentially in association with the user experience object). That control may be an open control that is structured such that, if interacted with by a user, the application is caused to open. An example of the open control is the open control 203 of FIG. 2. Alternatively, that control may be an install control that is structured such that, if interacted with by a user, the application is caused to install. An example of the install control is the install control 303 of FIG. 3.

The method 700 may be performed multiple times for different applications. User experience objects that represent a capability that is common across multiple applications are generated by populating a copy of a user interface template that represents that capability.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
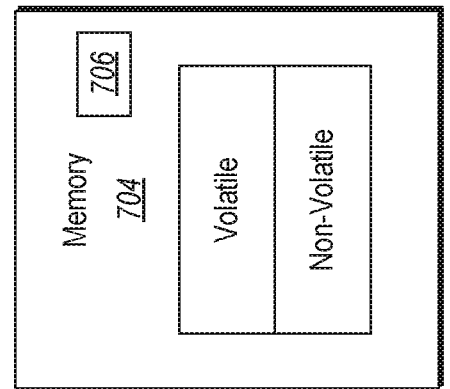
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system.

Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:

one or more processors; and one or more computer-readable media having thereon computer-executable instructions that are structured such that, if executed by the one or more processors, the computing system would be configured to generate visualizations of one or more capabilities of one or more applications by doing the following:

accessing a set of user experience templates each corresponding to a respective application capability that is shared for multiple applications, each of the user experience templates corresponding to a different application capability, the user experience templates being reusable for the multiple applications;

accessing an application definition of an application for which a particular capability is to be visualized, the particular capability being a capability shared by the multiple applications;

in response to determining that the particular capability of the application is to be visualized, generating a user experience object that, when visualized, represents an example user interface corresponding to the application implementing the particular capability, the generating of the user experience object being performed by the following:

accessing a user experience template corresponding to the particular capability from the set of user experience templates, the particular capability being shared by the multiple applications; and populating a copy of the user experience template using application-specific information from the application definition that visualizes at least one of an application identifier or one or more actions that correspond to the particular capability, and keeping in the copy of the user experience template static information from the user experience template that visualizes the particular capability that is shared by the multiple applications; and visualizing the user experience object simultaneously with at least one other visualized user experience object that represents a different example user interface corresponding to a different capability of the application.

2. The computing system in accordance with claim 1, the computer-executable instructions being further structured such that, if executed by the one or more processors, the computing system is caused to further cause a visualization of the user experience object to be rendered to a user.

3. The computing system in accordance with claim 2, the computer-executable instructions being further structured such that, if executed by the one or more processors, the computing system is caused to further cause the visualization of the user experience object to be rendered to the user subsequent to the application being installed on a device of the user thereby enabling the user to explore the capabilities of the application post-installation, along with an open control that is structured such that, if interacted with by a user, the application is caused to open.

4. The computing system in accordance with claim 2, the computer-executable instructions being further structured such that, if executed by the one or more processors, the computing system is caused to further cause the visualization of the user experience object to be rendered to the user along with an install control that is structured such that, if interacted with by a user, the application is caused to install.

5. The computing system in accordance with claim 1, the computer-executable instructions being further structured such that, if executed by the one or more processors, the computing system is caused to further cause a visualization of the user experience object to be rendered to the user, and to cause an control to be rendered to the user, the control being structured such that, if interacted with by a user, the application is caused to open or install.

6. The computing system in accordance with claim 1, the computer-executable instructions being further structured such that, if executed by the one or more processors, user experience objects that represent a capability that is common across multiple applications are generated by populating a copy of a user interface template that represents that capability.

7. The computing system in accordance with claim 1, the application being configured to run on an application platform.

8. The computing system in accordance with claim 7, the application platform being an operating system.

9. The computing system in accordance with claim 7, the application platform being an augmentable application, each of the multiple applications being usable to augment functionality of the augmentable application.

10. The computing system in accordance with claim 7, the multiple applications being in an app store.

11. The computing system of claim 1, wherein the copy of the user experience object is generated by at least populating the copy of the user experience template with application-specific information from the application definition that visualizes both of the application identifier as well as the one or more actions that correspond to the particular capability that are identified in the application definition.

12. A method for generating computer visualizations of one or more capabilities of one or more applications, the method comprising:

accessing a set of user experience templates each corresponding to a respective application capability that is shared for multiple applications, each of the user experience templates corresponding to a different application capability, the user experience templates being reusable for the multiple applications;

accessing an application definition of an application for which a particular capability is to be visualized, the particular capability being a capability shared by the multiple applications;

in response to determining that the particular capability of the application is to be visualized, generating a user experience object that, when visualized, represents an example user interface corresponding to the application implementing the particular capability, the generating of the user experience object being performed by the following:

accessing a user experience template corresponding to the particular capability from the set of user experience templates, the particular capability being shared by the multiple applications; and populating a copy of the user experience template using application-specific information from the application definition that visualizes at least one of an application identifier or one or more actions that correspond to the particular capability, and keeping in the copy of the user experience template static information from the user experience template that visualizes the particular capability that is shared by the multiple applications; and visualizing the user experience object simultaneously with at least one other visualized user experience object that represents a different example user interface corresponding to a different capability of the application.

13. The method in accordance with claim 12, the particular capability being a first capability, the user experience template being a first user experience template, the user experience object being a first user experience object, the static information being first static information the method further comprising the following in response to determining that at least one capability of an application is to be visualized:

identifying a second capability of the application using the application definition corresponding to the application; and accessing a second user experience template corresponding to the second capability;

populating a copy of the second user experience template using application-specific information from the application definition; and keeping in the copy of the second user experience template second static information from the second user experience template, the copy of the second user experience template being the generated second user experience object.

14. The method in accordance with claim 13, the application being a first application, the copy of the first user experience template being a first copy of the first user experience template, the application definition being a first application definition, the method further comprising:

determining that at least one capability of a second application is to be visualized;

in response to determining that at least one capability of the second application is to be visualized, identifying the second application as having the first capability a second application definition; and populating a second copy of the first user experience template using application-specific information from the second application definition; and keeping in the second copy of the first user experience template the first static information from the first user experience template, the second copy of the first user experience template being the generated second user experience object.

15. The method in accordance with claim 12, the application having already been installed on a user device or server accessible by the user device, the method further comprising causing an open control to be rendered to the user, the open control structured such that, if interacted with, the application is opened.

16. The method in accordance with claim 12, further comprising causing an install control to be rendered to the user, the install control structured such that, if interacted with, the application is installed.

17. The method in accordance with claim 12, the application being configured to run on an application platform.

18. The method in accordance with claim 17, the application platform being an operating system.

19. The method in accordance with claim 17, the multiple applications being in an app store.

20. A hardware storage device that have stored thereon computer-executable instructions that are structured such that, if executed by one or more processors of a computing system, the computing system would be caused to generate computer visualizations of one or more capabilities of one or more applications by:

accessing a set of user experience templates each corresponding to a respective application capability that is shared for multiple applications, each of the user experience templates corresponding to a different application capability, the user experience templates being reusable for the multiple applications;

accessing an application definition of an application for which a particular capability is to be visualized, the particular capability being a capability shared by the multiple applications;

in response to determining that the particular capability of the application is to be visualized, generating a user experience object that, when visualized, represents an example user interface corresponding to the application implementing the particular capability, the generating of the user experience object being performed by the following:

accessing a user experience template corresponding to the particular capability from the set of user experience templates, the particular capability being shared by the multiple applications; and populating a copy of the user experience template using application-specific information from the application definition that visualizes at least one of an application identifier or one or more actions that correspond to the particular capability, and keeping in the copy of the user experience template static information from the user experience template that visualizes the particular capability that is shared by the multiple applications; and visualizing the user experience object simultaneously with at least one other visualized user experience object that represents a different example user interface corresponding to a different capability of the application.

* * * * *